Dec. 12, 1967      W. T. RENTSCHLER      3,357,334
PHOTOGRAPHIC CAMERA WITH HIGH SPEED SHUTTER OPERABLE
AT SMALL DIAPHRAGM APERTURE SETTINGS
Filed July 14, 1965      3 Sheets-Sheet 1
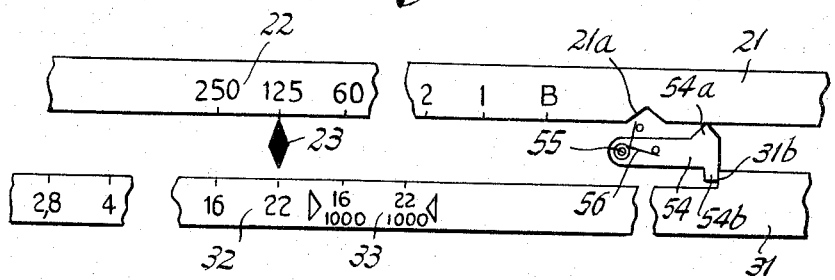
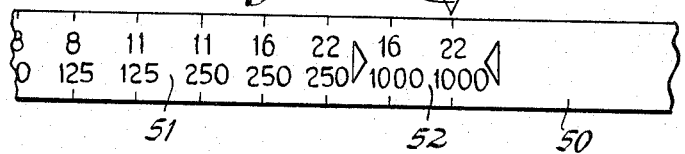
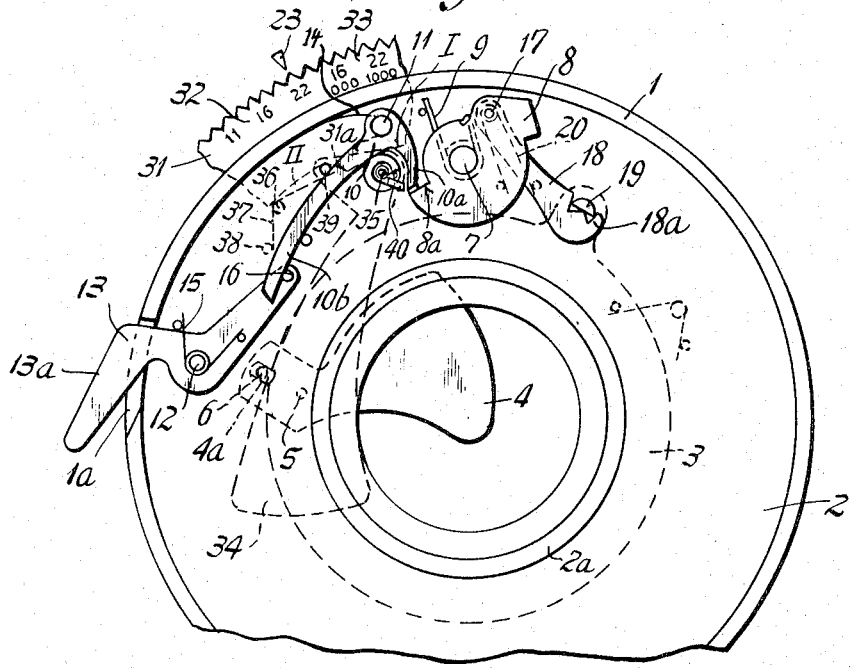
INVENTOR.
Waldemar T. Rentschler
BY
Arthur A. March
ATTORNEY

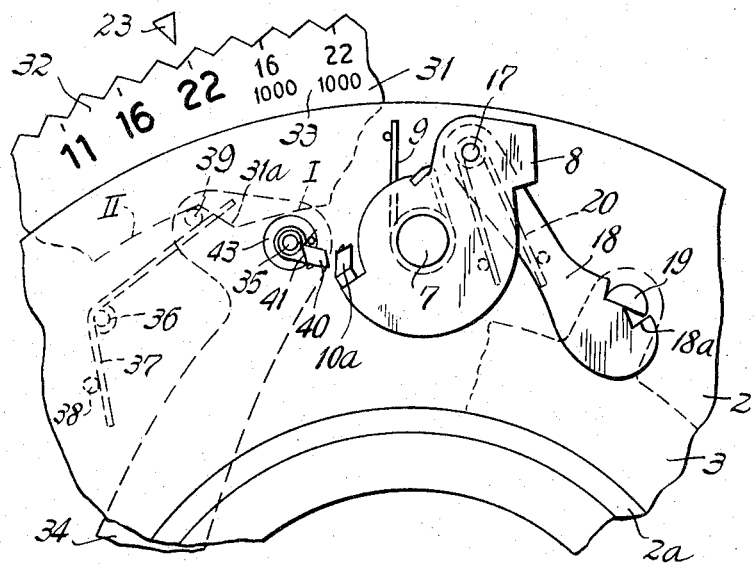
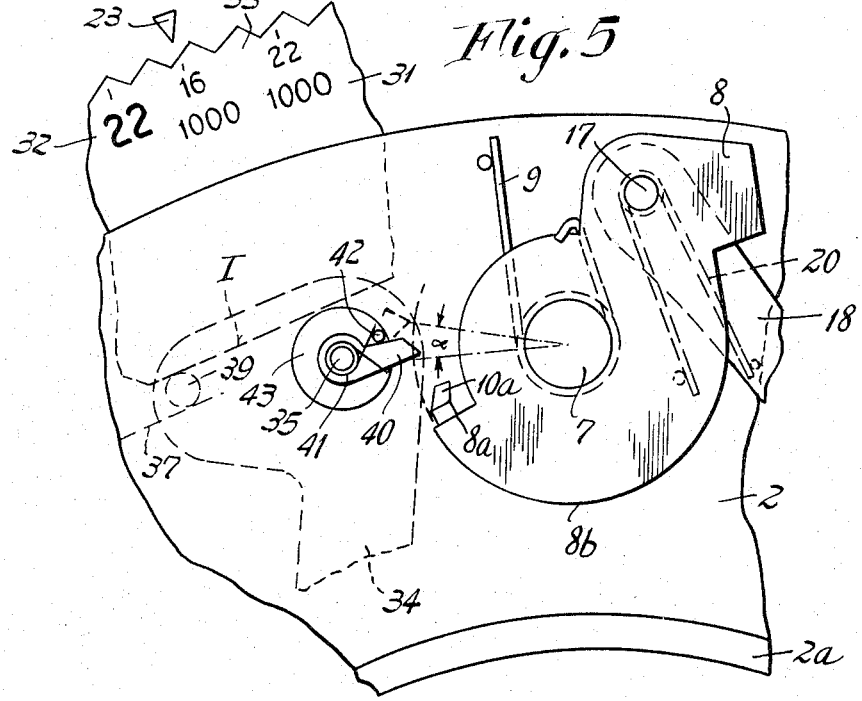

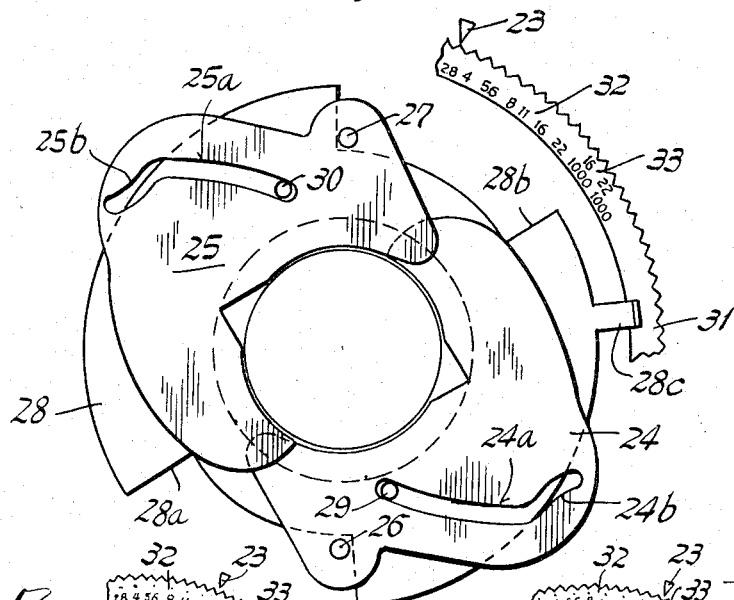
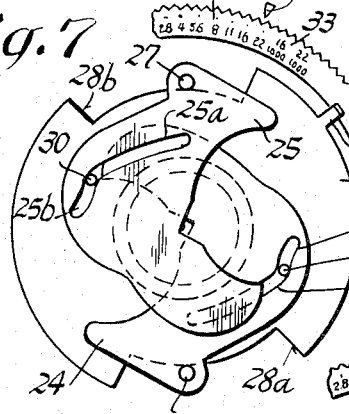
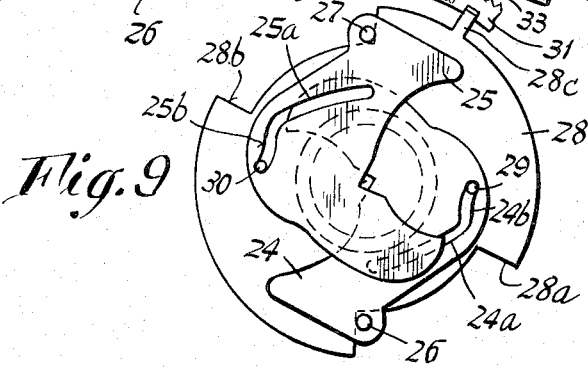

United States Patent Office 3,357,334
Patented Dec. 12, 1967

3,357,334
PHOTOGRAPHIC CAMERA WITH HIGH SPEED SHUTTER OPERABLE AT SMALL DIAPHRAGM APERTURE SETTINGS
Waldemar T. Rentschler, Gauthier Strasse 41, Calmbach, Black Forest, Germany
Filed July 14, 1965, Ser. No. 471,846
Claims priority, application Germany, July 25, 1964, G 41,190
3 Claims. (Cl. 95—63)

ABSTRACT OF THE DISCLOSURE

A photographic camera shutter mechanism having at least one main shutter blade and operating means connected thereto to move the blade from a closed position to an open position and back to a closed position. Also provided is an adjustable diaphragm and a scale associated with a diaphragm adjusting means to adjust the diaphragm in a range of diaphragm values. Further, an additional shutter blade and an exposure time scale are provided. Control means are connected to the shutter operating mechanism to control the operation thereof. The diaphragm scale comprises an additional exposure value range following the smallest of the normal aperture values and includes an extremely short exposure time value not contained in the exposure time scale and diaphragm values corresponding to some of the smallest aperture values. Means are connected to the diaphragm adjusting mechanism to control the aperture thereof, this last-named means being connected to the additional blade to move this blade into position to connect with the operating means only when one of the additional exposure values is set so that the additional blade may close the aperture corresponding to a value of the additional exposure value range in accordance with the extremely short exposure time value. The last-named means, when the shutter is set to the additional exposure value range, yields in a first position a larger aperture and in a second position the smallest aperture.

This invention relates to a photographic camera having a main shutter system and in particular the invention relates to such a camera having means to control the diaphragm aperture setting at certain prescribed values in connection with operation with the high speed shutter.

It has been known heretofore in cameras having shutter blades positioned on two relatively rotatable rings to change the overlap of the blades so that, for ultra high speeds and small diaphragm aperture sizes, the blades would merely swing out far enough to uncover the small aperture and then would be able to close again more quickly than if they had to swing out to the full aperture size of which the camera was capable. While such arrangements have permitted an extension of the available range of exposure values, there are still disadvantages due to the necessity of the shutter speed variation and the comparatively high cost of additional structure elements which also increase the sources of error and make it more difficult to adjust the mechanism.

The present invention provides a relative simple and economical structure, which is at the same time less prone to give trouble than some of the foregoing structures of the prior art. The present invention includes a mechanism in which, in addition to the normal setting range, additional setting values may be obtained through a continuous change of the diaphragm aperture.

In a shutter according to the present invention a diaphragm setting member is provided with a scale of aperture values and an additional scale beyond the smallest of the normal aperture values. The additional scale includes diaphragm values corresponding to some of the smallest settings in the main scale. It is also contemplated that the diaphragm scale may be part of a program setting member and that the additional scale may indicate, in addition to diaphragm values, shutter speed values, these shutter speed values being of higher shutter speeds, or shorter time durations, than any of the shutter speeds of the regular shutter speed setting scale or part of the program setting scale. The mechanism for which the scales furnish an indication includes a variable diaphragm, a main shutter blade or blades and an additional shutter blade, the latter being positioned so that it can be driven by the driving mechanism that operates the main shutter blade or blades or can be moved aside so that it will not be operated. When the additional shutter blade is brought into operation, the main shutter blade or blades must first be actuated to uncover the aperture, which will be one of the smallest apertures of the range to which the diaphragm may be set, and then the additional shutter blade will be actuated to move in front of the small aperture and close it off. This makes it possible to provide additional shutter speed and diaphragm paired values, thereby extending the exposures to be made on extremely sensitive films without risk of overexposure.

The invention will be described hereinafter with respect to the following drawings in which:

FIG. 1 is a diagrammatic and partial view of a pair of setting members, one for the diaphragm aperture and one for the shutter speed with the diaphragm aperture setting member having a scale of normal values and an additional scale;

FIG. 2 is a modification of the arrangement of FIG. 1 showing a program setting member with both shutter speed and diaphragm aperture scales on it including extended readings for very high speed exposures at very small aperture sizes;

FIG. 3 is a front view of a photographic intralens shutter constructed according to the invention, with an additional shutter blade disconnected from the cocked driving mechanism of the shutter;

FIG. 4 is an enlarged partial view of the mechanism of FIG. 3;

FIG. 5 is an enlarged partial view of the mechanism of FIG. 4 with the additional blade in starting position and connected to the driving mechanism of the shutter;

FIG. 6 shows one type of diaphragm mechanism for the shutter of FIG. 3 with the diaphragm blades set to the largest aperture value;

FIG. 7 shows the mechanism of FIG. 6 set to the smallest aperture value;

FIG. 8 shows the mechanism of FIG. 6 with the diaphragm aperture set at a value slightly greater than the smallest and in the extended range; and FIG. 9 shows the mechanism of FIG. 6 set to the smallest aperture value and in the extended range.

Three of the drawings show a housing 1 of a photographic shutter. This housing has a base plate 2 with a tubular socket 2a for holding the objective lens assembly of the camera. A driving ring 3 is rotatably mounted at the rear of the base plate 2 to drive a plurality of main shutter blades 4, only one of which is shown in the drawings for reasons of clarity. The shutter blades are pivotally mounted on pins 5 on the driving ring 3 and are mounted on fixed pins 6 that engage slots 4a. A shaft 7 is also mounted in the base plate 2 and a driving device, or disc, 8 is nonrotatably attached to the shaft 7 to actuate the shutter blades. The other end of the shaft 7 extends from the rear wall of the shutter housing 1 and may be connected in a known manner to a film transport device, not shown in the drawing. A coil spring 9 is wound around the shaft 7 and is hooked over the driving disc 8 to apply pressure to rotate the disc clockwise. An arresting lever 10 for the disc 8 is pivotally mounted on the fixed axle 11 and has an arm 10a at one end that extends into the path of motion of the projection 8a on the driving disc while the other end of the lever 10 extends into the path of motion of a release lever 13 pivotally mounted on a fixed pin 12 and having a finger piece 13a that projects outwardly through a slot 1a in the side wall of the shutter housing. The arresting lever 10 is acted upon by a spring 14 that tends to rotate it counterclockwise, but at the same time a spring 15 wound about the fixed pin 12 tends to rotate the release lever clockwise and to press a pin 16 on the lever 13 against an arm 10b of the arresting lever 10.

A driving pawl 18 is articulating attached to the driving disc 8 by means of a pivot pin 17. The free end of the driving pawl 18 is formed with usual coupling jaw 18a that embraces a semi-circular pin 19 on the driving ring 3. The coupling jaw 18a is held in engagement with the pin 19 by a spring 20 wound upon the pivot pin 17 and pressing the pawl 18 counterclockwise against the semi-circular pin 19.

When the apparatus just described runs down in making a photographic exposure, the ring 3 first rotates clockwise to cause the shutter blades 4 to pivot about the fixed pins 6 to their open position. Continued rotation of the driving disc 8 causes the ring 3 to rotate in the reverse direction thereby drawing the shutter blades 4 to their closed positions. If the driving disc 8 is cocked again by actuating the film transport device referred to hereinabove, the driving pawl 18 slides along the lower surface of the pin and re-establishes connection between the pin 19 and jaw 18a only at the end of the cocking process in response to pressure of the spring 20.

There is also arranged on the base plate 2 a conventional exposure time escaping mechanism which is not shown in the drawing but which cooperates with the driving disc 8 to delay, to a greater or lesser extent, the running down of the driving disc 8 during the open position of the shutter blades. FIG. 1 shows some of the setting members of the shutter mechanism including an exposure time, or shutter speed, setting member 21 which may actually be in the form of a ring although it is shown here spread out as a flat strip. In the form of a ring it may be rotatably mounted on the tubular socket 2a of the base plate 2 in FIG. 3. The shutter speed setting member, or control, 21 has a shutter speed scale 22 which is shown in the present embodiment with shutter speed values ranging from 1 second to $\frac{1}{250}$ second, as well as a mark "B" indicating the setting position for carrying out B-exposure. The shutter speed control is set with reference to a fixed mark 23 which may be arranged, for example, on the circumference of the side wall of the shutter housing.

The mechanism described hereinabove also includes a diaphragm that can be set at different aperture sizes and which, in the present embodiment, has two blades 24 and 25 as shown in FIGS. 6 to 9 mounted on pivot pins 26 and 27 respectively, which are diametrically oppositely arranged on the bottom of the shutter housing. Each of the diaphragm blades 24 and 25 has a curved control slot 24a and 25a, respectively, and an annular disc 28 located below the diaphragm blades is provided with two segment-like openings 28a and 28b as well as two diametrically opposite control pins 29 and 30 that engage the slots 24a and 25a. These slots are so formed and arranged with respect to the pins 29 and 30 that the blades 24 and 25 move either to close down or to open up the aperture as the disc 28 is rotated. The disc is moved by means of an arm 28c extending approximately radially therefrom and connected to the setting member 31 which has a diaphragm aperture scale 32 that includes values, in the present embodiment, "2.8" to "22" and which is set with respect to the fixed mark 23.

As may be seen in the drawing the diaphragm setting member 31 has, in addition to the setting range defined by the diaphragm scale 32 another exposure value setting range 33 that follows the diaphragm value "22" and within which there are paired at least two of the diaphragm values contained in the scale 32 with an extremely high shutter speed not contained in the shutter speed scale 22. In the present embodiment the diaphragm values "16" and "22" are paired with the shutter speed of $\frac{1}{1000}$ second. In order to carry out this type of setting, the slots 24a and 25a of the diaphragm blades 24 and 25 are formed so that their ends 24b and 25b are bent back after the smallest diaphragm value "22" has been reached. When the setting member 31 is moved beyond the value "22" the diaphragm discs are opened to the value of "16" and, if rotation is continued in the same direction, the diaphragm blades are then re-closed to the value "22" as shown in FIGS. 8 and 9.

The highest shutter speeds are obtained by using an additional blade 34 associated with the main shutter blades 4. When the diaphragm setting member 31 is set to one of the two shutter speed diaphragm aperture pairs of the additional exposure value setting range, the additional blade 34 covers the diaphragm aperture "16" or "22" after this small aperture has been uncovered by the shutter blades and before the regular shutter blades 4 can be returned again to the closed position. For this purpose the blade 34 can be nonrotatably affixed to a shaft 35 pivotally mounted on the base plate 2 as shown in FIGS. 3 to 5. One end of a coil spring 37 wound around a fixed pivot pin 36 bears against another fixed pin 38 while the other end of the same spring engages a pin 39 on the additional blade 34. The spring exerts a clockwise pressure to hold the blade 34 in the position shown in the drawing with the pin 39 engaging a control edge 31a of the diaphragm setting member 31. This control edge has two steps I and II, step I being associated with the shutter speed of $\frac{1}{1000}$ second of the additional exposure value setting range 33 while step II becomes operative when the diaphragm setting member 31 is set at one of the diaphragm values of scale 32. The blade 34 is driven by the driving disc 8 by means of a projection 8a that cooperates with a pawl 40 rotatably mounted on the free end of the shaft 35. The pawl 40 is pressed against the pin 42 by means of a spring 41 that exerts a counterclockwise pressure on the pawl. The pin 42 in turn is mounted on a disc 43 which is nonrotatably attached to the shaft 35.

FIG. 2 shows a setting member by means of which the the foregoing device may be used in those cameras equipped with a single setting member 50 controlling the setting devices for both the diaphragm and shutter speed in the sense of a uniform exposure value gradation. If there is a total diaphragm setting range from "2.8" to "22" and an exposure time setting range from $\frac{1}{30}$ second to $\frac{1}{250}$ second, the association of diaphragm values and exposure time values may, for example, be arranged in the manner indicated by the scale 51 of the program setting member 50. In addition to the scale 51, this program setting member also includes an additional exposure value setting range 52 made up of two diaphragm values "16" and "22" paired with extremely high shutter speeds of $\frac{1}{1000}$ second.

Insofar as the control of the setting device for diaphragm aperture and shutter speed by the program setting member 50 within the additional exposure value setting range 52 is concerned, the same control means may be used as are provided for the operative connection of the diaphragm setting member 31 in the embodiment according to FIG. 1. In addition, for the purpose of obtaining the combinations of shutter speed and diaphragm aperture inscribed in the scale 51, the program setting member 50 may be equipped with mutually adjusted, or synchronized, control means which may take the form of cams or other known suitable means adapted to control the diaphragm blades and the shutter speed escapement mechanism. In order to control the additional blade 34, a control edge consisting of the steps I and II may be arranged on the program setting member 50 as shown in the embodiment according to FIG. 1. Since both the scale 51 and the two exposures values of the additional exposure value setting range are printed on the setting member 50, the positioning of the latter is made with reference to a fixed mark 53.

The method of operation of the foregoing shutter arrangements are as follows:

If one of the value pairs of shutter speed and diaphragm aperture size of the additional exposure value setting range 33 or 52, depending upon the embodiment, is placed opposite the fixed mark 23 or 53, the pin 39 of the additional blade 34 will automatically engage the step I of the control edge 31a as illustrated in FIG. 5. The additional blade 34 then occupies a position such that the pawl 40 is located in the path of motion of the projection 8a. If, in this setting position of the additional blade 34, the previously cocked driving disc 8 is released for running down by actuation of the release lever 13, the driving disc first moves the shutter blades 4 into their open position by means of the driving pawl 18 and the ring 3 in the manner described hereinabove. After the shutter blades 4 have opened far enough to clear the diaphragm aperture value "16," and while the shutter blades are still moving toward their most open position, the projection 8a strikes the pawl 40 and moves it into the position indicated by the broken line in FIG. 5. This causes the additional blade 34 to be moved into its covering position, whereby the small diaphragm aperture that has previously been uncovered by the shutter blades 4 is closed again much sooner than the shutter blades could close it. The additional blade 34 is kept in this closing position by the outer edge 8b of the driving disc 8; this edge 8b is in the shape of the arch of a circle and supports the pawl 40 through the action of the spring 37 pressing on the additional blade.

If one of the scale values of the diaphragm scale 32 (FIG. 1) or a pair of shutter speed and aperture size values of the scale 51 is placed opposite the fixed mark 23 or 53, the pin 39 of the additional blade 34 moves into the region of the step II of the control edge 31a. This enables the additional blade 34 to change over to the position illustrated in FIGS. 3 and 4 in which this blade is outside the exposure aperture of the intralens shutter. The pawl 40 is thereby also moved out of the path of movement of the projection 8a so that when the driving disc 8 runs down, the projection 8a cannot influence the additional blade 34.

In order to avoid over-exposures, for example, in photographic cameras which are provided with a built in exposure meter and operate according to the resetting principle, it is advisable to arrange a locking device between the two setting members 21 and 31 for diaphragm and shutter speed. This locking device may be constructed so that the diaphragm setting member 31 can be set at the additional exposure value setting range 33 only if the shutter speed control 21 is set for the highest shutter speed in the scale 22 which, in the example illustrated, is 1/250 second. As illustrated in FIG. 1, the locking device may be an arresting lever 54 pivotally mounted on a fixed pivot pin 55 and provided with a spring 56 that tends to rotate the lever counterclockwise. At one end the arresting lever 54 has a projection 54a that cooperates with a notch 21a in the shutter speed control 21 and a stop 54b that cooperates with a stop 31b on the diaphragm setting member 31. The projection 54a is able to enter the notch 21a only when the shutter speed control 21 is set at a value of 1/250 second. This permits the lever 54 to be pivoted upwardly so that the stop 54b is displaced to permit the diaphragm setting member 31 to be set at the additional scale and exposure value range 33. Such a setting of the diaphragm setting member 31 is not possible when the shutter speed control is set at a slower shutter speed than 1/250 second because the stop 54b would then be located in front of the stop edge 31b.

Instead of the additional blade 34 as illustrated in FIG. 3, it is possible to use, for the same purpose, an additional blade which is provided with an opening that briefly uncovers the small diaphragm aperture of the additional scale and then continues to swing through in the same direction to close the aperture again, all in one motion. This all occurs during and in less time than the opening and closing of the main shutter blade system.

What is claimed is:

1. A shutter mechanism comprising at least one main shutter blade; operating means connected thereto to move said blade from a closed position to an open position and back to a closed position; an adjustable diaphragm; a scale associated with the diaphragm-adjusting means to adjust said diaphragm in a range of diaphragm values; an additional shutter blade; an exposure time scale; control means connected to said shutter operating mechanism to control the operation thereof; said scale comprising an additional exposure value range following the smallest of the normal aperture values and including an extremely short exposure time value not contained in the exposure time scale and diaphragm values corresponding to some of the smallest aperture values; means connected to said diaphragm adjusting mechanism to control the aperture thereof, said last-named means being connected to said additional blade to move said additional blade into position to connect with said operating means only when one of the additional exposure values is set, whereby said additional blade may close the aperture corresponding to a value of the additional exposure value range in accordance with said extremely short exposure time value, said last-named means, when the shutter is set to the additional exposure value range, yielding in a first position a larger aperture and a second position the smallest aperture.

2. The shutter mechanism of claim 1 in which said control means is also connected to said operating means to control both the operating speed of said main shutter and the aperture size of said diaphragm.

3. The shutter mechanism of claim 1 comprising, in addition: separate shutter control means connected to said operating means to control the operating speed of said main shutter over a predetermined speed range, said shutter control means comprising an interlock also connected to said control means connected to said diaphragm whereby said shutter control means must be set at the highest shutter speed of said range before said control means connected to said diaphragm can be moved beyond the setting position for the smallest diaphragm aperture and into an extended range of positions corresponding to at least said smallest diaphragm aperture and the next-to-the-smallest aperture and in which said additional blade is moved into position to connect with said operating means.

References Cited

UNITED STATES PATENTS 2,367,526   1/1945   Riddell _____ 95—63

JOHN M. HORAN, *Primary Examiner.*